Patented June 9, 1942

2,286,129

UNITED STATES PATENT OFFICE 2,286,129

CATALYSIS

Preston L. Veltman, Fishkill, N. Y., assignor, by mesne assignments, to The Texas Company, New York, N. Y., a corporation of Delaware No Drawing. Application August 2, 1940, Serial No. 350,097

8 Claims. (Cl. 196—10)

This invention relates to a catalyst and the employment of the catalyst for the conversion of hydrocarbons and particularly for effecting conversion of petroleum hydrocarbons.

Broadly, the invention contemplates a catalyst, as well as the conversion of hydrocarbons with a catalyst comprising a metallic halide containing two or more different halogen atoms, namely, fluorine, chlorine, bromine, and iodine, combined with one metal in the same molecule, and which will be defined herein as a mixed metallic halide. Examples of such catalysts comprise aluminum dichloro fluoride, aluminum chloro difluoride and the like. Hydrogen halide may be used as a promoter for the mixed metallic halide catalyst.

The invention contemplates the employment of a catalyst comprising a mixed metallic halide of the foregoing type or a mixture of two or more of these mixed metallic halides for effecting conversion and/or molecular transformation of hydrocarbons, and particularly petroleum hydrocarbons. The catalyst is contemplated for reactions, such as isomerization, alkylation, polymerization, cracking and reforming. The mixed metallic halides described herein are adaptable to hydrocarbon reactions known to be catalyzed by metallic halides, such as aluminum chloride, zinc chloride, iron chlorides, etc.

The mixed halides of this invention, including hydrated forms thereof, may be employed alone or in combination with other catalytic agents or with suitable carrier or supporting materials, or may be dissolved or dispersed in suitable liquid media. Thus, these mixed metallic halides may be employed in conjunction with simple metallic halides of the type AlCl$_3$, SbCl$_3$, etc. Examples of suitable carriers comprise natural or artificial clays, such as aluminum silicates and fuller's earth. Other materials include silica, alumina, diatomaceous earth, bauxites, aluminum phosphate and the like, including mixtures thereof. Suitable liquid media would include inorganic salts of relatively low melting point, such as SbCl$_3$ and SbF$_5$, metallic organic compounds, and organic compounds capable of carrying the catalyst in suspension or in solution. Certain metallic halide-hydrocarbon complexes may also serve as carriers for the catalysts described herein such as the complex formed during the isomerization of pentane with the catalyst of this invention or with a simple metallic halide.

It is already known to employ a metallic halide, such as aluminum chloride, as a catalyst for effecting cracking, isomerization, polymerization, and alkylation of hydrocarbons. Aluminum chloride, promoted with hydrogen chloride, is an effective catalyst in such reactions, but its employment may be attended with certain difficulties, such as a tendency towards formation of sludge by-products. Moreover, aluminum chloride has appreciable solubility in liquid hydrocarbons so that in liquid phase operations considerable migration of the catalyst occurs. Also, it has a tendency to sublime in a reaction system where vaporized hydrocarbons are being treated with the catalyst in solid form.

A complex metallic halide, such as fluorinated aluminum chloride, as contemplated by the present invention, provides a catalyst which is superior to ordinary aluminum chloride with respect to resistance to sludging and subliming tendencies. It is less soluble in mineral oil and also requires a higher temperature for sublimation.

A quantity of aluminum chloro-fluoride catalyst was prepared by subjecting anhydrous aluminum chloride vapors at the sublimation temperature at atmospheric pressure to intimate contact with boron trifluoride in a glass tube so as to form a mixed aluminum chloro-fluoride salt and boron trichloride. The aluminum chloride and boron trifluoride were charged to the reaction in the proportion of 261.5 parts, by weight, of anhydrous aluminum chloride to 55 parts of boron trifluoride, the resulting solid product amounting to 228.5 parts by weight. These proportions can be changed so as to vary the amount of fluorine substituted for chlorine in the original aluminum chloride. The amount of boron trifluoride added was somewhat in excess of that theoretically required to form a compound having the formula AlCl$_2$F.

A bright yellow crystalline material was formed as an intermediate product which melted and decomposed during continued heating to give mixed halides and BCl$_3$. The boron trichloride was condensed and recovered in a trap cooled in a bath comprising a mixture of dry ice and kerosene.

The solid product finally obtained had a grey-white appearance, sublimed at a much higher temperature than aluminum chloride, dissolved slowly in water, and apparently is substantially insoluble in paraffinic hydrocarbons and alkyl halides. Its chemical analysis corresponds approximately to a mixed halide having a stoichiometric formula of AlCl$_2$F. The chemical reaction forming this catalyst apparently involves a process of double decomposition, as indicated by the following equation:

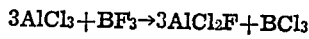
$$3AlCl_3 + BF_3 \rightarrow 3AlCl_2F + BCl_3$$

Mixed metallic halides can be prepared by simple partial replacement reactions using elemental halogens. The ability to displace one another from salts descreases in the order of fluorine, chlorine, bromine and iodine. That is, fluorine can displace chlorine, bromine and iodine, while chlorine can displace only bromine and iodine. Bromine can displace iodine only. By suitable selection of salts and control of the conditions under which the reaction is effected substantially any halogen ratio can be obtained in a single salt.

It is contemplated that many non-metallic fluorine compounds can be used as a source of fluorine. Hydrogen fluoride and organic fluorides react, at moderate temperatures, with metal salts, such as aluminum chloride, to give aluminum chloro fluoride which comprises one of the types of catalysts contemplated herein.

A sample of catalyst prepared in the foregoing manner by the reaction of $AlCl_3$ and $BF_3$, and having the approximate empirical formula of $AlCl_2F$, was employed as an alkylation catalyst in which isopentane was alkylated with triisobutylene. In carrying out the reaction about 100 parts of the catalyst, 4 parts of water (added to generate hydrogen halide promoter by hydrolysis) and 621 parts of isopentane by weight, were charged to a reaction vessel and there subjected to continuous agitation. 100 parts triisobutylene, by weight, were introduced to the agitated mixture over a period of about one hour. A reaction temperature of around 0° F. was maintained. Stirring of the mixture was continued for about fifteen minutes after the addition of the olefin had been completed.

The product obtained comprised 200 parts of $C_6$ and heavier hydrocarbons and 325 parts of $C_5$ and lighter hydrocarbons by weight. The $C_6$ and heavier fraction was fractionated into a fraction "A" boiling up to 311° F., another fraction "B" boiling in the range 311 to 400° F., and a residual fraction "C" boiling about 400° F. The yields of these fractions, expressed as percent by volume of the total hydrocarbon charge, and also as percent by weight on the basis of the olefin charge, were as follows:

|  | Fraction | | |
|---|---|---|---|
|  | A | B | C |
| Percent by volume of charge | 66.1 | 22.6 | 11.3 |
| Percent by weight of olefin | 126.0 | 46.5 | 24.0 |
| Bromine number | 1 | 7 | .9 |
| Specific gravity | 0.6817 | 0.7543 | 0.7938 |
| C. F. R. M. octane | 84.4 | | |

Another sample of the same catalyst was employed as an isomerization and cracking catalyst in which normal pentane was subjected to conversion by contact with the catalyst at a relatively low temperature. In this experiment 1224 parts of normal pentane, 135.1 parts of catalyst, and 5.9 parts of water, by weight, were charged to a reaction vessel. The mixture was maintained in the vessel at a temperature of around 160° F. for a period of about four hours, the pressure ranging from about 40 to 117 pounds per square inch gauge.

As a result of this treatment the hydrocarbon product comprised 96.7%, by weight, of the normal pentane charge. The remaining 3.3% of the charge was in the form of a metallic halide-hydrocarbon complex.

The hydrocarbon product was subjected to a low temperature fractional distillation, obtaining the following fractions and yields thereof, expressed as mol per cent:

|  | Mol. per cent |
|---|---|
| Hydrocarbons boiling below isobutane | 0.1 |
| Isobutane | 53.0 |
| n-Butane | 4.7 |
| Isopentane | 20.5 |
| n-Pentane | 5.4 |
| Hydrocarbons boiling above n-pentane | 16.3 |

The foregoing analysis demonstrates that the catalyst is highly active for catalyzing either isomerization or cracking reaction.

While a mixed halide of aluminum has been described above, it is nevertheless contemplated that mixed halides of other metals capable of combining with two or more halogen atoms may be used. Polyvalent metals in groups 2, 3, 4, 5 and 6 of the periodic table including iron, cobalt, nickel and the noble metals are capable of being prepared in the metal-mixed halide form. It is contemplated that the mixed halide compound may have an empirical formula such as $$MeH^1{}_xH^2{}_y$$

where $x$ and $y$ have values sufficient to satisfy the valency of the particular metal in question, and $H^1$ and $H^2$ are different halogen atoms as for example $SbCl_2F$, $SbCl_2Br$, $SbClF_2$, etc. and mixtures thereof.

Also it is contemplated that the catalyst of this invention may comprise a mixture of mixed halide compounds of two or more different metals.

Obviously many modifications and variations of the invention, as hereinbefore set forth, may be made without departing from the spirit and scope thereof, and therefore only such limitations should be imposed as are indicated in the appended claims.

I claim:

1. A catalyst for effecting conversion of hydrocarbons into gasoline hydrocarbons of improved antiknock characteristics which comprises aluminum halide containing chlorine and fluorine atoms in the same molecule and attached to the same aluminum atom.

2. A catalyst for effecting conversion of hydrocarbons into gasoline hydrocarbons of improved antiknock characteristics which comprises a mixed halide of aluminum containing fluorine and a different halogen atom in the same molecule and having the approximate empirical formula $AlF_xH_y$, where H signifies a halogen other than fluorine, and $x$ and $y$ have values sufficient to satisfy the valency of the aluminum.

3. A catalyst for effecting conversion of hydrocarbons into gasoline hydrocarbons of improved antiknock characteristics which comprises the product formed by reacting aluminum chloride with boron trifluoride at the sublimation temperature for aluminum chloride under the conditions of reaction so as to form a yellow crystalline intermediate reaction product, and subjecting said intermediate product to continued heating to convert it into a relatively stable solid of greyish appearance and consisting essentially of aluminum chlor-fluoride having the approximate empirical formula $AlCl_xF_y$, where $x$ and $y$ have values sufficient to satisfy the valency of the aluminum.

4. In a process for manufacturing gasoline hydrocarbons of high antiknock characteristics, the steps comprising subjecting a hydrocarbon feed comprising olefins and paraffins to contact with an active catalyst comprising a metallic mixed halide containing at least two different halogen atoms in the same molecule, and effecting the contact between feed hydrocarbons and catalyst under conditions such that there is substantial reaction between the hydrocarbon constituents of the feed by chemical condensation to form normally liquid gasoline hydrocarbons.

5. In a process for manufacturing gasoline hydrocarbons of high antiknock characteristics, the steps comprising subjecting a hydrocarbon feed comprising olefins and paraffins to contact with an active catalyst comprising a metallic mixed halide having the approximate empirical formula $MeH^1_xH^2_y$ where Me signifies a metal, $H^1$ and $H^2$ signify different halogen atoms and $x$ and $y$ have values sufficient to satisfy the valency of the metal, and effecting the contact between feed hydrocarbons and catalyst under conditions such that there is substantial reaction between the hydrocarbon constituents of the feed by chemical condensation to form normally liquid gasoline hydrocarbons.

6. In a process for manufacturing gasoline hydrocarbons of high antiknock characteristics, the steps comprising subjecting a hydrocarbon feed comprising olefins and paraffins to contact with an active catalyst comprising aluminum chlor-fluoride having the approximate empirical formula $AlCl_xF_y$ where $x$ and $y$ have values sufficient to satisfy the valency of the aluminum, and effecting the contact between feed hydrocarbons and catalyst under conditions such that there is substantial reaction between the hydrocarbon constituents of the feed by chemical condensation to form normally liquid gasoline hydrocarbons.

7. In a process for manufacturing gasoline hydrocarbons of high antiknock characteristics, the steps comprising reacting a low boiling isoparaffin hydrocarbon with a low boiling olefin hydrocarbon in the presence of an active metallic mixed halide catalyst having the approximate empirical formula $MeH^1_xH^2_y$ where Me signifies a metal, $H^1$ and $H^2$ signify different halogen atoms and $x$ and $y$ have values sufficient to satisfy the valency of the metal, and effecting the contact between feed hydrocarbons and catalyst under alkylating conditions such that there is substantial alkylation to form gasoline hydrocarbons.

8. The method according to claim 7 in which the catalyst comprises aluminum chlor-fluoride.

PRESTON L. VELTMAN.